(12) United States Patent
Jaatinen et al.

(10) Patent No.: US 8,514,817 B2
(45) Date of Patent: Aug. 20, 2013

(54) ADAPTIVE PREAMBLE LENGTH FOR CONTINUOUS CONNECTIVITY TRANSMISSION

(75) Inventors: Jussi Jaatinen, Helsinki (FI); Massimo Bertinelli, Frederiksberg (DK); Karri Ranta-aho, Espoo (FI)

(73) Assignee: Nokia Corporation, Espoo (FI)

( * ) Notice: Subject to any disclaimer, the term of this patent is extended or adjusted under 35 U.S.C. 154(b) by 1176 days.

(21) Appl. No.: 11/703,064

(22) Filed: Feb. 5, 2007

(65) Prior Publication Data

US 2007/0189237 A1 Aug. 16, 2007

Related U.S. Application Data

(63) Continuation-in-part of application No. 11/499,847, filed on Aug. 4, 2006.

(60) Provisional application No. 60/772,999, filed on Feb. 13, 2006.

(51) Int. Cl.
 *H04B 7/216* (2006.01)
(52) U.S. Cl.
 USPC .......................................... 370/335; 370/320
(58) Field of Classification Search
 USPC .................... 370/320, 328–338, 342, 441
 See application file for complete search history.

(56) References Cited

U.S. PATENT DOCUMENTS

| | | | |
|---|---|---|---|
| 4,503,533 A | 3/1985 | Tobagi et al. | |
| 4,730,307 A | 3/1988 | Hughes et al. | |
| 5,272,728 A * | 12/1993 | Ogawa | 375/372 |
| 5,974,056 A | 10/1999 | Wilson et al. | |
| 6,467,092 B1 | 10/2002 | Geile et al. | |
| 6,549,785 B1 | 4/2003 | Agin | |
| 6,725,054 B1 | 4/2004 | Hwang et al. | |
| 6,731,948 B1 | 5/2004 | Lee et al. | |
| 6,735,635 B1 * | 5/2004 | Feeney et al. | 370/445 |
| 6,859,445 B1 * | 2/2005 | Moon et al. | 370/335 |
| 6,868,075 B1 | 3/2005 | Narvinger et al. | |

(Continued)

FOREIGN PATENT DOCUMENTS

| | | | |
|---|---|---|---|
| EP | 1560339 | | 3/2005 |
| GB | 2382746 A | * | 6/2003 |

(Continued)

OTHER PUBLICATIONS

Nokia, Continuous connectivity for packet data users, 3GPP TSG-RAN WG1 Meeting #43, Nov. 7-11, 2005, RI-051463. Introduktion.

(Continued)

*Primary Examiner* — Kashif Siddiqui
(74) *Attorney, Agent, or Firm* — Squire Sanders (US) LLP

(57) ABSTRACT

The specification and drawings present a new method, system, apparatus and software product for defining an adaptive preamble length of a preamble for a continuous connectivity transmission using a control channel, e.g., a UL (uplink) dedicated physical control channel (DPCCH), for transmitting the preamble. Such a preamble would reduce the accuracy requirement for the initial power setting after a transmission gap and also help the channel estimation and the synchronization of a data channel, e.g., an enhanced dedicated channel (E-DCH). The preamble length can be optimized and defined using a predetermined criterion depending on: a) a degree of fading of a multipath channel which is used for transmitting data on the data channel and/or b) a throughput relative to a nominal throughput in the data channel.

35 Claims, 6 Drawing Sheets

(56) References Cited

U.S. PATENT DOCUMENTS

| | | | |
|---|---|---|---|
| 6,944,232 B2 | 9/2005 | Koga et al. | |
| 6,967,935 B1 | 11/2005 | Park et al. | |
| 6,967,994 B2* | 11/2005 | Boer et al. | 375/219 |
| 7,006,464 B1 | 2/2006 | Gopalakrishnan et al. | |
| 7,206,597 B2 | 4/2007 | Sudo | |
| 7,212,823 B2 | 5/2007 | Granzow et | |
| 7,218,947 B2* | 5/2007 | Cao et al. | 455/522 |
| 2002/0097697 A1* | 7/2002 | Bae et al. | 370/335 |
| 2003/0086384 A1* | 5/2003 | Kwon et al. | 370/320 |
| 2003/0224836 A1 | 12/2003 | Tsai et al. | |
| 2004/0018832 A1 | 1/2004 | Duhnam | |
| 2004/0170165 A1 | 9/2004 | Maciocco et al. | |
| 2005/0147022 A1 | 7/2005 | Hosur et al. | |
| 2005/0221833 A1* | 10/2005 | Granzow et al. | 455/450 |
| 2006/0023749 A1 | 2/2006 | Yoshizawa et al. | |
| 2006/0256709 A1* | 11/2006 | Yang | 370/206 |
| 2007/0030829 A1* | 2/2007 | Vimpari et al. | 370/335 |

FOREIGN PATENT DOCUMENTS

| | | |
|---|---|---|
| JP | 2004159248 | 6/2004 |
| WO | 03044985 | 5/2003 |
| WO | 2004042940 | 5/2004 |
| WO | WO 2007029067 A2 | 3/2007 |

OTHER PUBLICATIONS

GB 2382746A (Telefonaktiebolaget LM Ericsson (Publ)), Jun. 4, 2003, p. 10, line 20-line 24; p. 12, line 21-line 34.

Ericsson, Draft answer on liaison on power control preamble length, 3GPP TSG-RAN WG1 #17, Stockholm Sweden, Nov. 21-24, 2000. RI-00-1422 Fourth question.

Yan, N.; Ho, P., "on-off keying assisted acquisition scheme for burst mode DS/SS packet radio," Vehicular Technology Conference, 1994 IEEE 44$^{th}$, vol., No., p. 586, line 8-line 9.

Enz, C.C.; El-Hoiydi, A.; Decotignie, J.-D.; Peiris, V., "WiseNET: an ultralow-power wireless sensor network solution," Computer, vol. 37, No. 8, pp. 62-70, Aug. 2004.

3GPP—ETSI TS 125 214 V6.6.0 (Jun. 2005) Universal Mobile Telecommunications System (UMTS); Physical layer procedures (FDD), Release 6 (8 pages).

3GPP—ETSI TS 125 101 V5.8.0 (Sep. 2003) Universal Motile Telecommunications System (UMTS); User Equipment (UE) radio transmission and reception (FDD), Release 5 (12 pages).

TR 101 112 V3.2.0 (Apr. 1998) UMTS 30.03 version 3.2.0, Universal Mobile Telecommunications System (UMTS); Selection procedures for the choice of radio transmission technologies of the UMTS (UMTS 30.03 version 3.2.0) (84 pages).

3GPP TR 25.896 V6.0.0 (Mar. 2004) Technical Specification Group Radio Access Network; Feasibility Study for Enhanced Uplink for UTRA FDD (180 pages).

3GPP TR 25.840 V4.0.0 (Dec. 2003) Technical Specification Group Radio Access Network; Terminal power saving features (30 pages).

"Gated Control Channel Transmission in WCDMA Forward Link" by Sami Salonen, Master's thesis, University of Oulu, Finland, 2002 (62 pages).

3GPP TR 25.899 V6.1.0 (Sep. 2004) Technical Specification Group Radio Access Network; High Speed Download Packet Access (HPDPA) enhancements (68 pages).

European Search Report issued Mar. 3, 2010 in parallel European Patent Application No. 07705548.1 (3 pages).

3GPP TR 25.903 Vo.2.0 (Nov. 2005), 3$^{rd}$ Generation Partnership Project; Technical Specification Group Radio Access network; Continuous Connectivity for Packet Data Users (Release 7), Nov. 1, 2005 (44 pages).

Massimo Bertinelli and Jussi Jaatinen, Nokia Research Center, "VoIP over HSUPA: link level performance study," Wireless Communication Systems, 2006. ISWCS '06, 3$^{rd}$ International Symposium on IEEE, Sep. 1, 2006 (6 pages).

"UL DPCCH Gating-Further Link Level Performance Results," 3GPP TSG-RAN WG1, Meeting #45; R1-061354, Shanghai, China, May 8-12, 2006 (14 pages).

English Abstract of Korean Publication No. KR 20010018183, published Mar. 5, 2001, 1 page English Abstract, Samsung Electronics Co Ltd, "Device and Method for Performing Access Communication in Mobile Communication System," Ahn Jae Min et al.

Korean Publication No. No. KR 20010018183, published Mar. 5, 2001, Samsung Electronics Co Ltd, "Device and Method for Performing Access Communication in Mobile Communication System," Ahn Jae Min et al. (14 pages).

"CR 25.214-111: DPCCH power control preamble," TSG RAN Working Group 1 (Radio layer 1), TSGR1#14 (00) 0809, Alcatel, Jul. 1-7, 2000 (4 pages).

Korean Office Action (4 pages) and English translation thereof (3 pages) dated Feb. 22, 2011 in parallel Korean Patent Application No. 10-2008-7022277 (7 pages total).

Japanese Publication No. 2004159248, published Jun. 3, 2004, Hiroaki Sudo, Matsushita Electric Ind. Co. Ltd, English Abstract (1 page).

3GPP TR 25.214 V6.6.0 (Jun. 2005), Technical Specificaton Group Radio Access Network, Physical layer procedures (FDD) (Release 6) (58 pages).

3GPP TSG RAN WG1 Meeting #46bis RI-062988, Seoul, Korea, Oct. 9-13, 2006.

Digital Transmission on Fading Multipath Channels, http://zone.ni.com/devzone/conceptd.nsf/webmain/A4792F204D85239E86256DF90061D5, Copyright 2002.

TR 101 112 V3.2.0. (Apr. 1998) UMTS 30.03 version 3.2.0, Universal Mobile Telecommunications System (UMTS); Selection procedures for the choice of radio transmission technologies of the UMTS (UMTS 30.03 version 3.2.0.).

\* cited by examiner

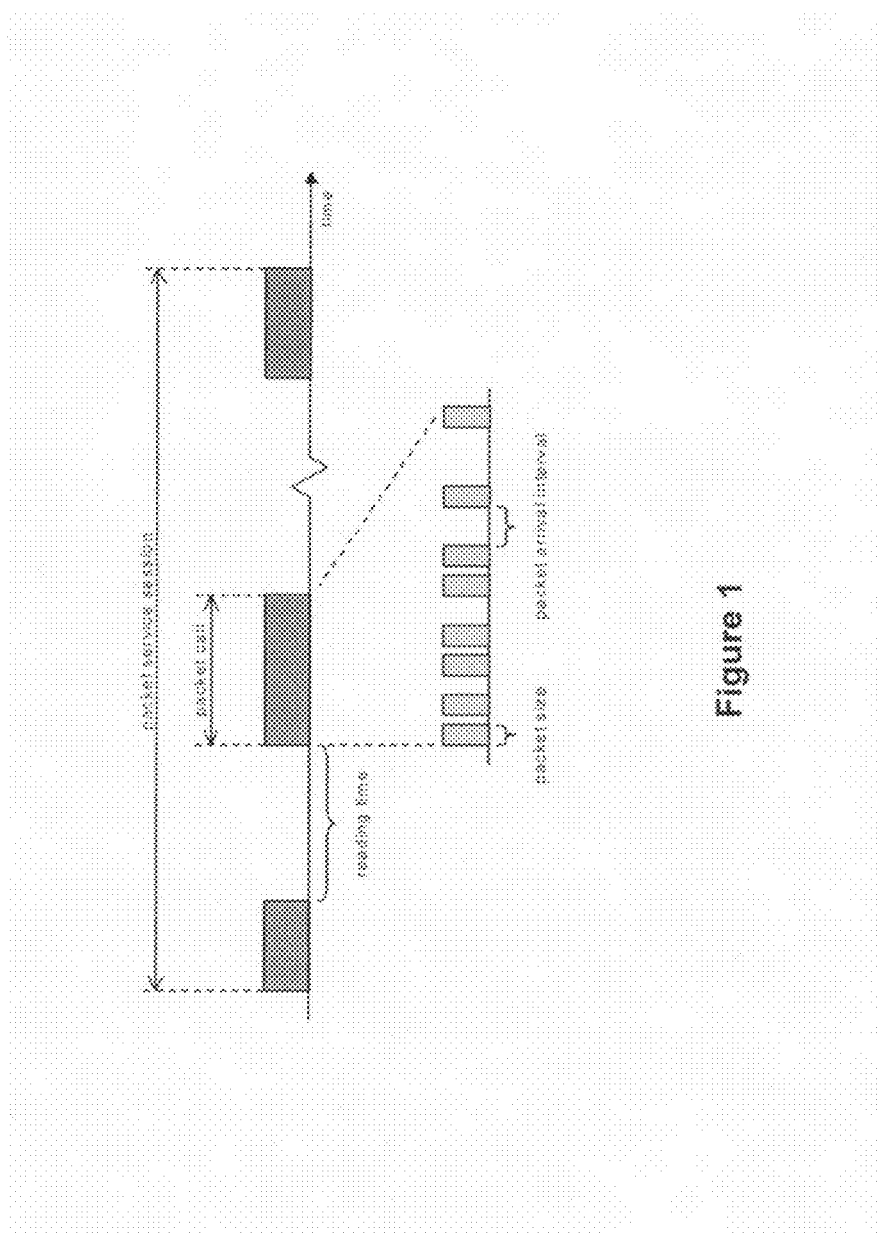

ADAPTIVE PREAMBLE LENGTH FOR CONTINUOUS CONNECTIVITY TRANSMISSION

PRIORITY AND CROSS REFERENCE TO RELATED APPLICATION

This application claims priority from U.S. Provisional Application Ser. No. 60/772,999, filed on Feb. 13, 2006. This application is also a Continuation-in-Part of U.S. application Ser. No. 11/499,847, filed on Aug. 4, 2006.

TECHNICAL FIELD

This invention generally relates to mobile/wireless communications and more specifically to defining an adaptive preamble length for a continuous connectivity transmission.

BACKGROUND ART

Packet data users are continuously connected to the network typically with only occasional periods of activity. In a continuously connected mode, the users do not relinquish their data channels during periods of inactivity only to re-establish them when traffic is available: this can create delays that would ruin the user experience. In order to allow for a large number of such users, the UEs can be configured to discontinue their DPCCH (continuous dedicated physical control channel) transmissions (i.e., using gating) when not sending data. Users can, for example, transmit one 2 ms TTI (transmission timing interval) of data every 2-5 frames and nothing in between (i.e., no DPCCH during the transmission gaps).

In an uplink (a direction from a user equipment to a network), when no dedicated channels (DCHs) and no corresponding dedicated physical data channels (DPDCHs) are configured, all data is transmitted on an enhanced dedicated channel (E-DCH) which is mapped to an enhanced dedicated physical data channel (E-DPDCH). Control signaling associated with the E-DCH is transmitted on an enhanced dedicated physical control channel (E-DPCCH). The E-DPDCH and E-DPCCH can be discontinuous and are transmitted only when there is data to be transmitted and the transmission has been granted by the network. In the uplink, in addition to the E-DPDCH and E-DPCCH, a continuous dedicated physical control channel (DPCCH) and possibly a continuous or discontinuous dedicated physical control channel (e.g., an uplink high speed dedicated physical control channel, HS-DPCCH) for an HS-DSCH (high speed downlink shared channel) are transmitted.

A packet service session contains one or several packet calls depending on the application as described in ETSI standard, TR 101 112, UMTS 30.03 "Selection procedures for the choice of radio transmission technologies of the UMTS", version 3.2.0. The packet service session can be considered as an NRT (non-real time) radio access bearer duration and the packet call as an active period of packet data transmission. During the packet call several packets may be generated, which means that the packet call constitutes a bursty sequence of packets. The burstiness is a characteristic feature of the packet transmission. A typical behavior of the packet data traffic is illustrated in FIG. 1.

The UL DPCCH carries control information generated at layer 1 (physical layer). The layer 1 control information consists of, e.g., known pilot bits to support channel estimation for coherent detection, transmit power control (TPC) for DL DPCH (dedicated physical channel), optional feedback information (FBI) and optional transport format combination indicator (TFCI). Typically, the UL DPCCH is continuously transmitted (even if there is no data to be transmitted for certain time periods), and there is one UL DPCCH for each radio link. The continuous transmission is not a problem with circuit switched services, which are typically sent continuously. However, for bursty packet services, continuous DPCCH transmission causes a significant overhead.

The uplink capacity can be increased by decreasing a control overhead. One possibility for decreasing the control overhead is UL DPCCH gating (or discontinuous transmission), i.e., not transmitting signals on the DPCCH all the time.

Rationale for using gating includes (but is not limited to):
providing user equipment (UE) power savings and longer battery life;
providing interference reduction; and
providing higher capacity.

There is a fast closed loop power control for all uplink signals to combat against the power imbalance between different user signals and fast fading. The Node B, e.g., estimates continuously a signal-to-interference ratio (SIR) of the DPCCH transmitted by the UE and compares an estimate to a target value, and transmits transmit power control (TPC) commands in a downlink to the UE to increase or decrease the transmit power level. With the power control, the signals from different UEs can be received with the required quality in changing conditions.

During the uplink transmission gap the UL power control cannot operate as normally because Node B cannot estimate the received signal quality to determine the proper TPC command (the SIR would be extremely low, and normally generated TPC commands would tell the UE to increase the UL transmit power). Therefore the transmission power to be used after the gap needs to be estimated or predefined. Due to a user movement or a change in propagation conditions (fading) it is likely that in case of a long transmission gap that the power used prior to the transmission gap is not sufficient to ensure a proper communication leading to increased usage of the HARQ (hybrid automatic repeat request) or too excessive thus increasing a UL noise making the UL power control and scheduling of UL capacity (e.g., in case of a high speed uplink packet access, HSUPA) more difficult.

In order to improve radio link performance, a DPCCH preamble with a duration of a few slots can be attached to the transmissions. This has a dual benefit of allowing both power control and channel estimation to adapt to the present link conditions. In terms of HARQ (hybrid automatic repeat request), the preamble can be attached either to the first transmission only, or to the first transmission and to subsequent retransmissions.

DISCLOSURE OF THE INVENTION

According to a first aspect of the invention, a method, comprises: providing a data signal on a data channel and a control signal on a control channel in a communication system adapted for continuously connected users; defining a preamble length of a preamble using a predetermined criterion, the preamble length depends on at least one of: a degree of fading of a multipath channel which is used for transmitting the data signal, a throughput relative to a nominal throughput in the data signal, and a transmission gap length in the control signal or in the data signal; and transmitting the control signal comprising the preamble.

According further to the first aspect of the invention, the throughput relative to a nominal throughput may be classified by K levels, wherein K is an integer of at least a value of two.

Further according to the first aspect of the invention, the degree of fading may be classified by N levels, wherein N is an integer of at least a value of two.

Still further according to the first aspect of the invention, the control channel may be an uplink dedicated physical control channel transmitting the power control preamble from a user equipment to a network element. Further, the network element may be a Node B and the network element and the user equipment may be configured for wireless communications. Still further, the user equipment may be a wireless device, a portable device, a mobile communication device or a mobile phone. Yet still further, the defining may be provided by the network element or may be provided by the user equipment.

According further to the first aspect of the invention, the data channel may be an enhanced dedicated channel.

According still further to the first aspect of the invention, before transmitting the preamble, the method may comprise: defining a preamble power time dependence using a further predetermined criterion.

According further still to the first aspect of the invention, the preamble length may further depend on a length of a transmission timing interval of the data signal.

According yet further still to the first aspect of the invention, during the defining, the preamble length may be changed by a pre-selected value using the predetermined criterion depending on a change in the transmission gap length. Still further, the preamble length may be non-zero only if the transmission gap exceeds a pre-defined threshold value.

According to a second aspect of the invention, a user equipment, comprises: an uplink scheduling and signal generating module (or in general, signal generation means), for providing a data signal on a data channel and a control signal on a control channel, wherein a preamble length of a preamble is defined adaptively using a predetermined criterion, and the preamble length depends on at least one of: a degree of fading of a multipath channel which is used for transmitting the data signal, a throughput relative to a nominal throughput in the data signal, and a transmission gap length in the control signal or in the data signal; and a module configured to transmit the control signal comprising the preamble (this module, in general, can be means for receiving and transmitting such as, e.g., a transceiver).

According further to the second aspect of the invention, the throughput relative to a nominal throughput may be classified by K levels, wherein K is an integer of at least a value of two and/or the degree of fading maybe classified by N levels, wherein N is an integer of at least a value of two.

Still further according to the second aspect of the invention, the defining may be provided by the network element, and/or the uplink scheduling and signal generating module may be configured to define the preamble length.

According still further to the second aspect of the invention, the data channel may be an enhanced dedicated channel.

According further still to the second aspect of the invention, the preamble length may further depend on a length of a transmission timing interval of the data signal. Still further, during the defining, the preamble length may be changed by a pre-selected value using the predetermined criterion depending on a change in the transmission gap length. Yet still further, the preamble length may be non-zero only if the transmission gap exceeds a pre-defined threshold value. Further still, the transmission gap length may be variable.

According yet further still to the second aspect of the invention, the preamble may have a dynamic length varied during transmission of the data signal.

Yet still further according to the second aspect of the invention, an integrated circuit may comprise the uplink scheduling and signal generating module and the module configured to transmit.

Still yet further according to the second aspect of the invention, the control channel and the data channel may be combined such that the control signal and the data signal are transmitted on one combined channel.

According to a third aspect of the invention, a communication system, comprises: a user equipment, for providing a data signal on a data channel and a control signal on a control channel in the communication system adapted for continuously connected users, wherein a preamble length of a preamble is defined using a predetermined criterion, the preamble depends on at least one of: a degree of fading of a multipath channel which is used for transmitting the data signal, a throughput relative to a nominal throughput in the data signal, and a transmission gap length in the control signal or in the data signal, and for transmitting the power control preamble on the control channel; and a network element, responsive to the control signal comprising the preamble.

According to a fourth aspect of the invention, a network element, comprises: a receiver, for receiving a data signal on a data channel and a control signal on a control channel from a user equipment; a downlink scheduling and signal generating module, for adaptively defining a preamble length of a preamble, wherein the preamble length depends, using a predetermined criterion, on at least one of: a degree of fading of a multipath channel which is used for transmitting the data signal, a throughput relative to a nominal throughput in the data signal, and a transmission gap length in the control signal or in the data signal; and a transmitter, for transmitting the preamble to the user equipment.

According to a fifth aspect of the invention, a computer program product comprises: a computer readable storage structure embodying computer program code thereon for execution by a computer processor with the computer program code, wherein the computer program code comprises instructions for performing the first aspect of the invention, indicated as being performed by any component or a combination of components of a network element or a user equipment

BRIEF DESCRIPTION OF THE DRAWINGS

For a better understanding of the nature and objects of the present invention, reference is made to the following detailed description taken in conjunction with the following drawings, in which:

FIG. 1 is a diagram illustrating characteristics of a packet service session, according to related art;

MODES FOR CARRYING OUT THE INVENTION

Figure 2A:
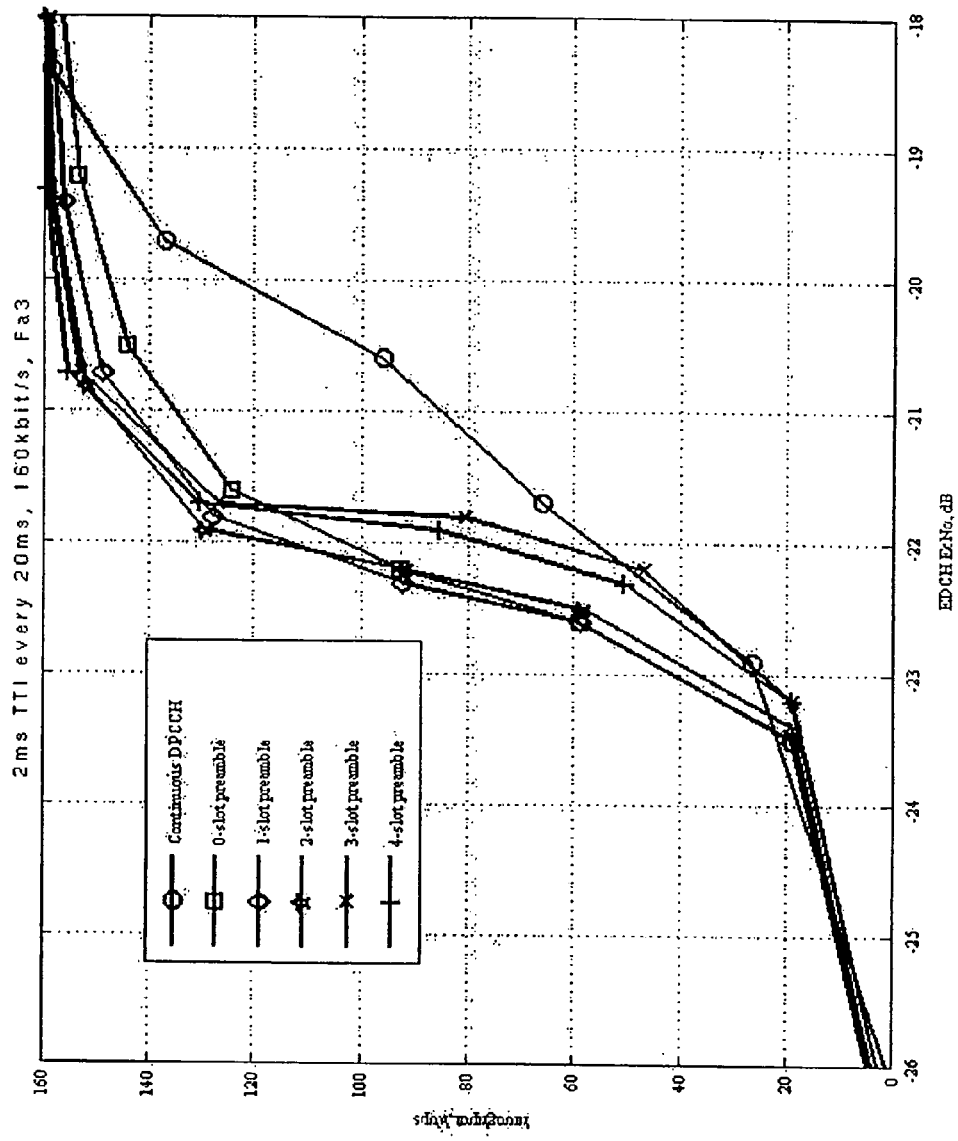
FIG. 2a and 2b are graphs showing simulation results of a system throughput as a function of $Ec/N_0$ for different preamble lengths for: a) strongly fading (e.g., a ITU defined Pedestrian A channel model with 3 km/h UE speed, or PA3) and b) less strongly fading (e.g., a ITU defined Vehicular A channel model with 30 km/h UE speed, or VA30) multipath channel.

A new method, system, apparatus and software product are presented for defining an adaptive preamble length of a preamble for a continuous connectivity transmission using a control channel, e.g., a UL (uplink) dedicated physical control channel (DPCCH), for transmitting the preamble. Such a preamble would reduce the accuracy requirement for the initial power setting after a transmission gap and also help the channel estimation and the synchronization of a data channel, e.g., an enhanced dedicated channel (E-DCH). According to one embodiment of the present invention, the preamble length can be optimized and defined using a predetermined criterion depending on: a) a degree of fading and/or degree of multipath reflections due to the radio channel which is experienced by the transmitted signal propagating from the transmitter to the receiver, which signal is used for transmitting data on the data channel (or a control signal on the control channel), b) a throughput relative to a nominal throughput in the data channel, and/or c) a transmission gap length (e.g., a period of inactivity which can be variable) in the discontinuous control signal (e.g., transmitted on the DPCCH) or in a discontinuous data signal, e.g., transmitted on an enhanced dedicated channel (E-DCH).

Moreover, according to a further embodiment of the present invention, the preamble length can further depend on a length of a transmission timing interval (TTI) of the discontinuous data signal. Furthermore, a power in the power control preamble (or preamble) can be changed in time (i.e., a time dependent power in the preamble, e.g., using ramping preamble or power changed in steps) using a further predetermined criterion.

According to embodiments of the present invention, the preamble length can be adaptively changed according to pre-existing knowledge and the prevailing channel conditions, as well as the operating point in use. Advantageously the preamble length determination could be done at a network element (e.g., Node B) and signalled to the UE (user equipment). In case of SHO (soft handover), the UE can combine the preamble length requests from multiple Node-Bs in the active set (i.e., the UE should decide what preamble length to use). If the preamble length determination is done at the RNC (radio network controller), there is no need for combination at the UE (i.e., there is only one setting for the preamble length communicated to the UE) but the signalling landscape can be more complex.

The challenge which can be solved by using various embodiments of the present invention is how to identify the optimal preamble length. On one hand, adding slots to a preamble gives benefit in terms of better power control and channel estimation, but on the other hand transmitting a longer preamble also consumes battery power and adds interference. Therefore, it should be determined, how many slots are "energy well spent" and beyond which adding more length to the preamble would not provide additional benefit.

Figure 2B:
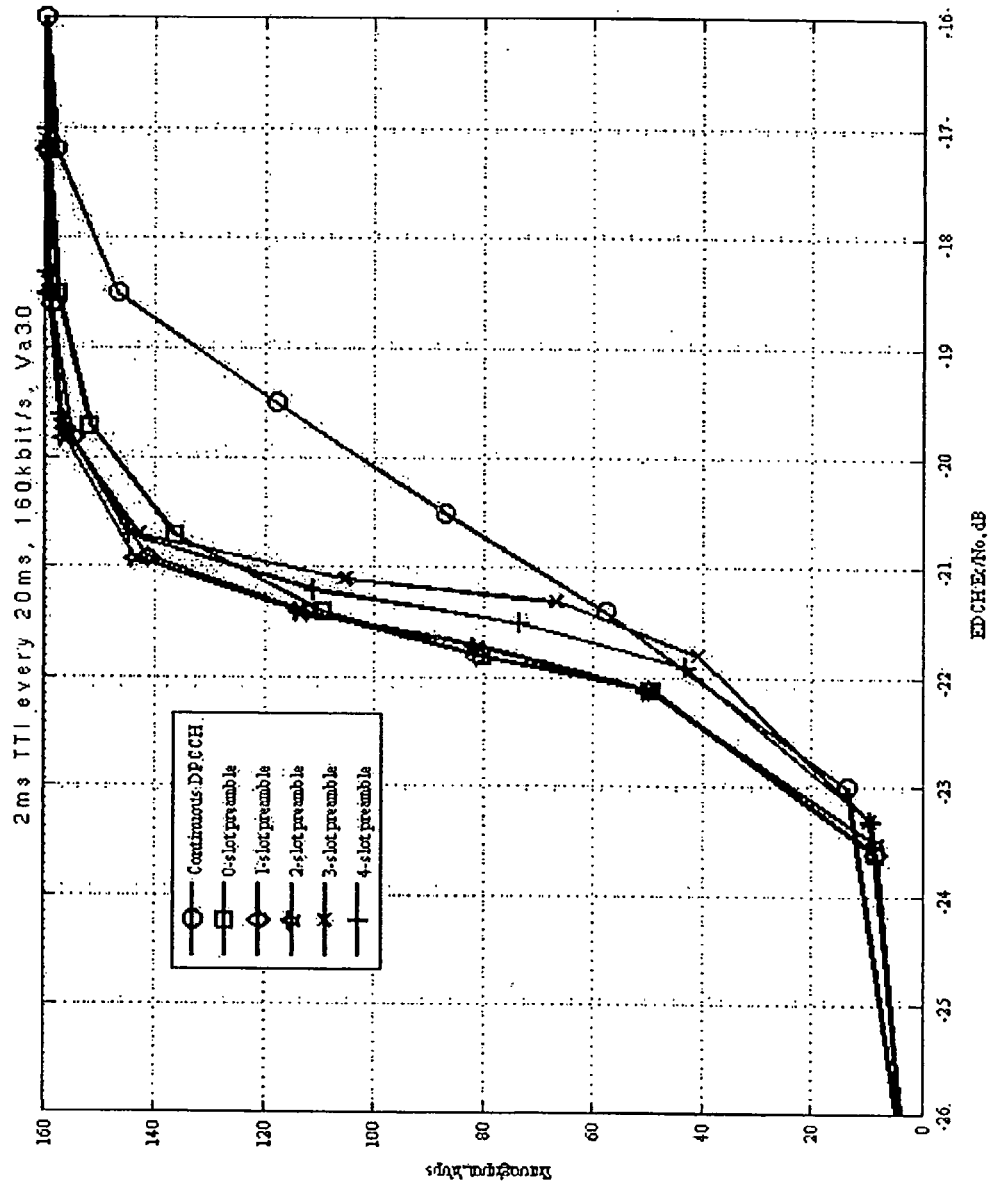

FIGS. 2a and 2b show the examples among others of graphs demonstrating single-user simulation results of a throughput as a function of $Ec/N_0$ (received energy per PN chip of the signal consisting of control and data channels being received to a total received power spectral density at an antenna connector of a Node B) for different preamble lengths for; a) strongly fading (PA3) and b) less strongly fading (VA30) multipath channels. Here PA3 means "Pedestrian A 3 km/h" and is defined here as a multipath environment where the tap (multipath component) configuration is (the power relative a first tap, tap delay given in nanoseconds): (0 dB 0 ns), (−20 dB 260 ns), (−24 dB 520 ns). VA30 is defined as "Vehicular A 30 km/h with the taps (0 dB 0 ns), (−2.4 dB 260 ns), (−6.5 dB 520 ns), (−9.4 dB 780 ns), (−12.7 dB 1040 ns). In the vehicular case (in FIG. 2b), the last tap has no rake receiver finger allocated to it, i.e., the Node B does not utilize the energy of the last multipath instance of the received signal, in all others (e.g., in the pedestrian case in FIG. 2a), the finger is allocated to the exact tap location, i.e., the Node B utilizes the energy of the other multipath instances of the signal fully when combining the multipath instances together as a single received signal. In other words, the settings can be chosen in order to have a significant trade-off between the energy collected from the channel and the complexity of the receiver. For example, in the vehicular case (in FIG. 2b), the last tap is much weaker than the others, and it's possible to discard it without significantly degrading the performance. This way, there is no need to allocate a further finger in the rake reciever, thus saving in the complexity.

As can be seen from FIGS. 2a and 2b, the optimal preamble length can depend on:

the multipath channel type: strongly fading(PA3)/less strongly fading(VA30), and/or the operating point: low/high throughput relative to nominal throughput; the high/low throughput can be defined, e.g., for the E-DCH data channel (E-DPDCH) according to the need of the application in use. Nominal throughput refers to the data rate of a single transmission. The actual throughput is lower due to retransmissions occurring after incorrect deliveries. If all packets get through successfully with the first try then throughput equals to the nominal throughput, if packets require in average 2 transmissions to get successfully delivered then throughput is equal to a half of the nominal throughput.

Also, as it was stated above, the gap length and other factors can affect the optimal preamble length as well.

These variables can be known to the network element (e.g., Node B). Then the network element can choose the optimal preamble length using the predetermined criterion and signal it to the UE. The optimal length can be determined, e.g., by simulations using link-level simulators: it is sufficient to categorize each parameter (e.g., fading, throughput, etc.) to two or a more categories (levels). For example, the multipath channel can be considered strongly fading or weakly fading (or categorized by N levels of fading in general, wherein N is an integer of at least a value of two), according to the number and relative strengths of channel taps in the RAKE receiver. If the channel is dominated by one tap (i.e., most of the energy of the signal is received via a single signal propagation path), then it is strongly fading whereas many equipotent taps indicate a weakly fading multipath channel.

For example, if the Node B receiver classifies the radio channel through which the radio signal propagates from the UE antenna to the Node B antenna as strongly fading, e.g., because more than 75% of the signal energy is received via a single path, the Node B can configure the UE to use 4 slot preamble length. Alternatively, it can configure the UE to use 2 slot preamble length. With a longer preamble, the power control has more time to adjust the transmitted power level to the correct setting before the data transmission takes place. With a strongly fading channel it is more probable that the power setting is further off from the optimum setting after the transmission gap than with a weakly fading channel.

One simple operation example, which can be implemented by software in the Node-B, can be broken down to the following steps, which are repeated for each Continuous Connectivity UE at configurable intervals:

classify Multipath channel to strongly or weakly fading multipath channel;

choose an optimized preamble length from a pre-computed table considering multipath classification, operating point and a gating profile; and signal the preamble length to the UE.

Note that the embodiments of the present invention should not be limited to the choices of the input parameters described above when adaptively defining the preamble length but other time-dependent or static parameters can be included as well, thus providing the network's ability to adjust the length of the preamble according to whatever criteria it sees fit, which may just as well be related to the specific receiver type, or implementation used for the external radio channel, or data rate conditions estimated or measured by the receiver.

The key advantage introduced here is savings in the noise rise generated per user, which allows more users to be placed in a cell using Continuous Connectivity. Even a small (in dB) savings per user results in several more users, which can increase the economic importance of the embodiments of the present invention. Moreover, according to an embodiment of the present invention, a network element (e.g., the node B or the RNC) can provide an instruction to the UE, e.g., to set a limit for the preamble length, e.g. from 0 up to 10 slots instead of providing a precise length using the same predetermined criterion described by the embodiments above. Then the final determination of the preamble length can be made by the UE using further considerations. For example, within the limit provided by the network element, the preamble length can be defined, depending on the DPCCH transmission gap length and/or on the E-DCH TTI (transmission timing interval) length: the shorter the transmission gap length the shorter the preamble length, and the longer the TTI length the shorter the preamble length (e.g., for 2 ms E-DCH TTI, the same preamble length could be needed and used with a shorter transmission gap than for the 10 ms E-DCH TTI).

Furthermore, according to an embodiment of the present invention, the preamble length can be defined, e.g., by a user equipment (UE) using the predetermined criterion with or without feedback from the network (e.g., the power control preamble in 3GPP TS25.214 is defined without the feedback, and the PRACH (physical random access channel) preamble in 3GPP TS25.211 and 3GPP TS25.214 is defined with the feedback). If a preamble is used with the feedback (e.g., a power ramping type of preamble), the maximum preamble length, after which the E-DCH transmission can be started even without the preamble ending feedback from the network element (e.g., a Node B), could be dynamic. A minimum preamble will protect against DL (downlink) TPC (transmit power control) errors, but a minimum preamble length may not need to be dynamic.

According to a further embodiment of the present invention, a preamble power time dependence can be defined using a further predetermined criterion including (but not limiting to): power ramping, using power step size, using higher power control step sizes until a feedback is received from the network element (e.g., the Node B), etc.

According to the predetermined criterion mentioned above, rules for defining the preamble length could be, e.g., to double the preamble length for a doubled transmission gap, to increase the preamble length by a pre-selected value (e.g., a pre-selected number of slots) after the transmission gap is changed by a further pre-selected value (e.g., a further pre-selected number of slots), or to increase the preamble length by a pre-selected value for every gap during a long E-DCH inactivity. The rules for defining the preamble length (including the maximum preamble length defined above) can also have a variety of similar dependences as a function of the TTI lengths.

It is noted that all embodiments of the present invention described above for the control channel, e.g., the UL DPCCH, can be applied to any L1 control channel in the UL (carrying, e.g., pilot and/or power control information) used for, e.g., channel estimation and power control and for downlink control channels as well. It is also noted, that defining the preamble length can be performed by the network element or by the UE as well, according to embodiments of the present invention. It is further noted that in one embodiment, the control channel and the data channel can be combined such that the control signal and the data signal can be transmitted on this combined channel.

Figure 3:
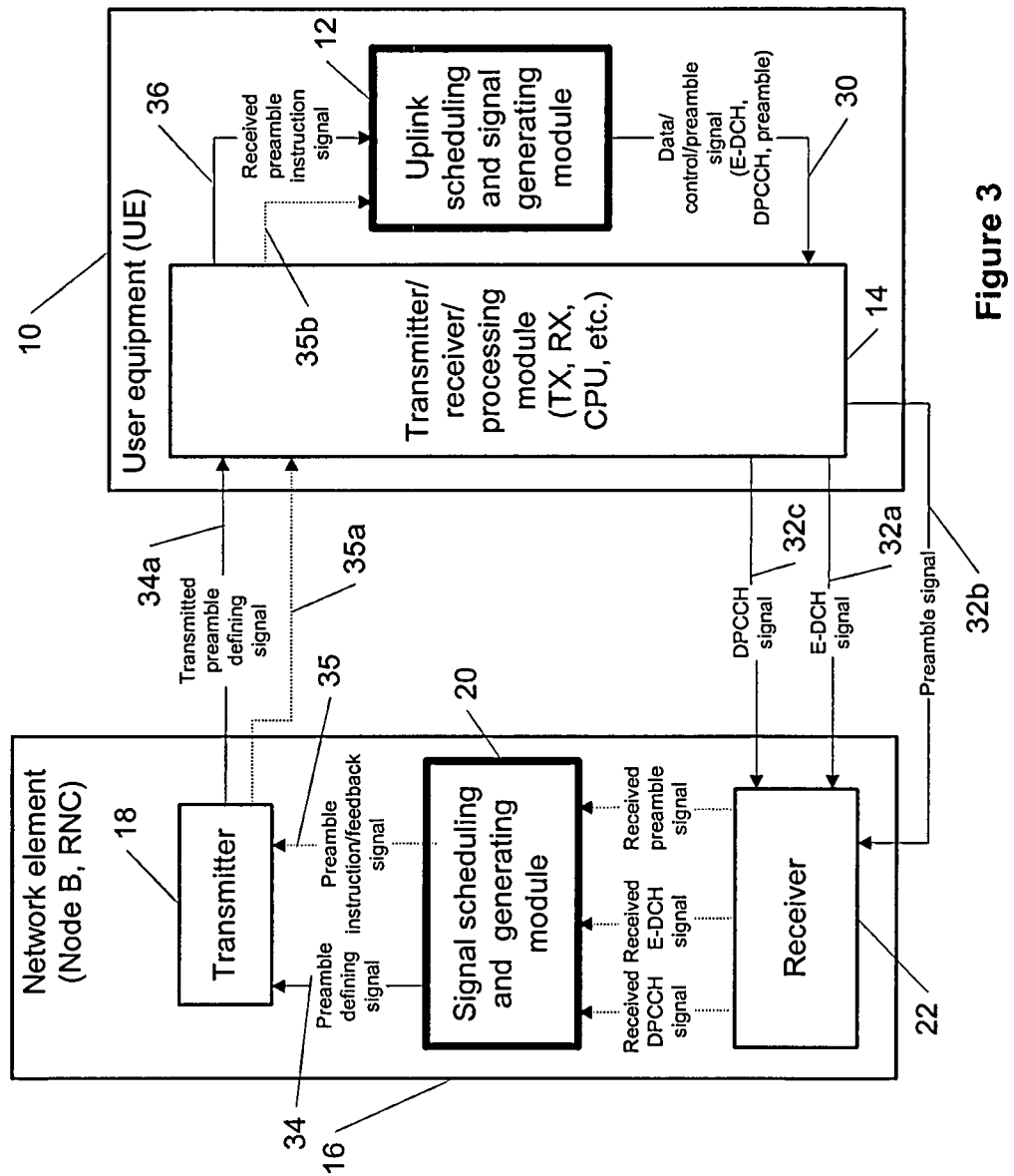
FIG. 3 is a block diagram to demonstrate defining an adaptive preamble length for a continuous connectivity transmission using, e.g., a dedicated physical control channel (DPCCH) for transmitting the preamble, according to an embodiment of the present invention.

FIG. 3 shows a block diagram of an example among others, which demonstrates defining an adaptive preamble length for a continuous connectivity transmission using, e.g., a dedicated physical control channel (DPCCH) for transmitting the preamble, according to an embodiment of the present invention.

In the example of FIG. 3, a mobile terminal 10 comprises an uplink scheduling and signal generating module 12 and a transmitter/receiver/processing module 14. It is noted that the module 12 can generally be signal generation means or a structural equivalence (or equivalent structure) thereof. Also, the module 14 can generally be transmitting and/or receiving means, e.g., a transceiver, or a structural equivalence (or equivalent structure) thereof. The user equipment 10 can be a wireless device, a portable device, a mobile communication device, a mobile phone, etc.

In the example of FIG. 3, a network element 16 (e.g., a node B or a radio network controller, RNC) comprises a transmitter 18, a signal scheduling and generating module 20 and a receiver 22. The module 20 can be used for providing (see signals 34, 34a and 36) a preamble defining signal which the preamble length, or alternatively a power control feedback and/or instruction (e.g., range) for the preamble length (see signals 35, 35a and 35b) to the user equipment 10, using the predetermined and further predetermined criteria, according to different embodiments of the present invention as described above.

According to an embodiment of the present invention, the module 12, 14 or 20 can be implemented as a software or a hardware module or a combination thereof. Furthermore, the module 12, 14 or 20 can be implemented as a separate module/block or can be combined with any other standard module/block of the user equipment 10 or the network element 16, respectively, or it can be split into several modules/blocks according to their functionality. The transmitter/receiver/processing module 14 can be implemented in a plurality of ways and typically can include a transmitter, a receiver, a CPU (central processing unit), etc. The transmitter and receiver can be combined, for example, in one module such as transceiver, as known in the art. The module 14 provides an effective communication of the module 12 with the network element 16. All or selected modules of the user equipment 10 can be implemented using an integrated circuit, and all or selected blocks and/or modules of the network element 16 can be implemented using an integrated circuit as well.

The module 12 can provide a data/control/preamble signal 30, according to embodiments of the present invention, which is then forwarded (signals 32a, 32b, 32c, wherein signals 32b and 32c are both transmitted on the DPCCH) to the receiver 22 of the network element 16. Specifically, the module 12 can provide, e.g., a discontinuous data signal (which comprises the E-DCH signal 32a transmitted on the E-DCH channel) and a discontinuous control signal (which comprises both the DPCCH signal 32c and the preamble signal 32b transmitted on the UL DPCCH channel).

If the UE 10 is used for defining the preamble, it can be coordinated and originated by the module 12. The module 12 can optimize the preamble length, using the predetermined criterion depending on the instructions signal (see signals 35, 35a and 35b) received from the network element 16 and by monitoring the appropriate parameters, e.g., a transmission gap length (which can be variable) in the discontinuous DPCCH signal 32c or in the discontinuous E-DCH signal 32a, and/or on a length of a transmission timing interval (TTI) of the E-DCH signal 32a (also the power dependence in the power control preamble can be optimized using the further predetermined criterion by the module 12).

It is also shown in FIG. 3 that the network element 16 can use the received preamble signal (which can be alternatively defined as a special format of the DPCCH signal) for proving a power control feedback (the preamble feedback signal 35). FIG. 3 further demonstrates that the received E-DCH signal and received DPCCH signal can be used by the module 20 to determine important parameters, such as the degree of fading in the radio channel or the used data rate and probability of successful transmission of a TTI for defining the preamble length by the module 20.

Figure 4:
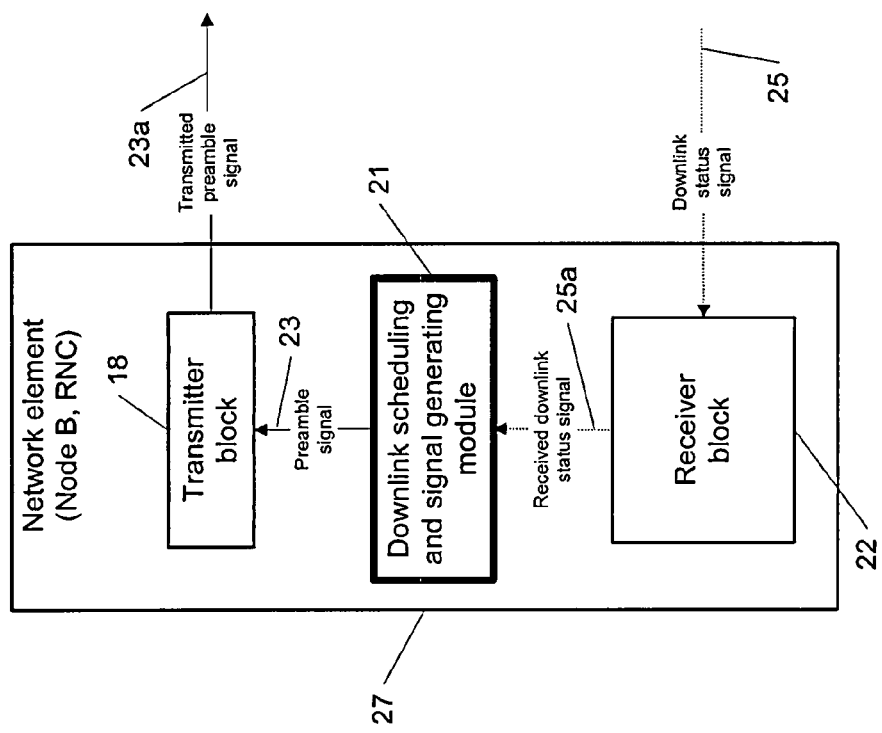
FIG. 4 is a block diagram to demonstrate defining an adaptive preamble length in DL, according to an embodiment of the present invention.

The example of FIG. 3 demonstrates defining the preamble length according to embodiments of the present invention in the UL direction. The same principles can be applied to the DL (downlink) direction, according to an embodiment of the present invention. FIG. 4 demonstrates such an arrangement wherein a downlink scheduling and signal generating module 21 of a network element 27 is used to define the preamble for the DL transmission using, e.g., the predetermined and further predetermined criteria, thus providing a preamble signal 23 which is then transmitted (a preamble signal 23a) downlink by the transmitter 18. Information (signals 25 and 25a) needed for determining the degree of fading of the multipath channel or/and a throughput relative to a nominal throughput in the downlink can be signaled to the network element by the UE.

Figure 5:
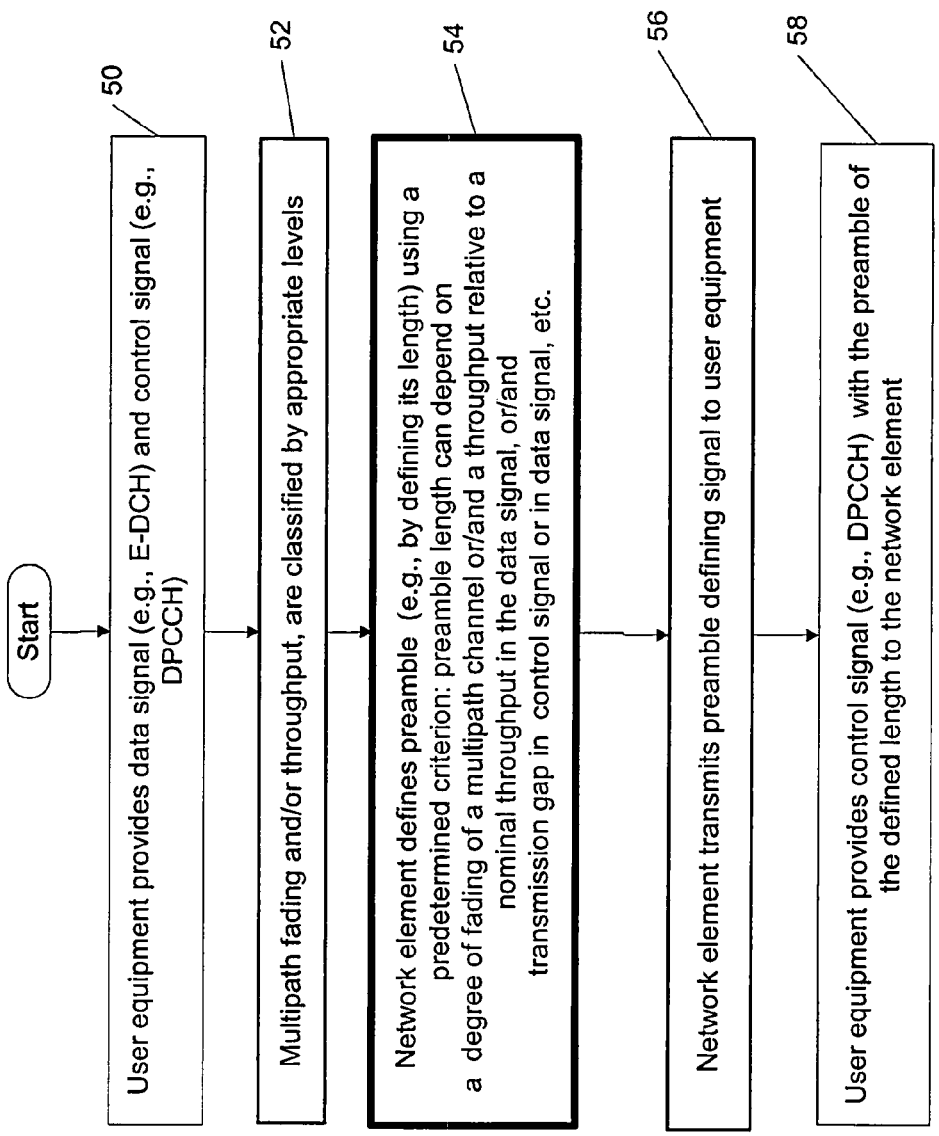
FIG. 5 is a flow chart to illustrate defining an adaptive preamble length for a continuous connectivity transmission using, e.g., a dedicated physical control channel (DPCCH) for transmitting the preamble, according to an embodiment of the present invention.

FIG. 5 is an example of a flow chart for defining an adaptive preamble length for a continuous connectivity transmission using, e.g., a dedicated physical control channel (DPCCH) for transmitting the preamble, according to an embodiment of the present invention.

The flow chart of FIG. 5 only represents one possible scenario among others. The order of steps shown in FIG. 5 is not absolutely required, so generally, the various steps can be performed out of order. In a method according to an embodiment of the present invention, in a first step 50, the user equipment 10 provides the discontinuous data signal (e.g., the E-DCH signal) 32a and the discontinuous control signal (e.g., the DPCCH signal) 32c to the network element 16.

In a next step 52, critical parameters, such as multipath fading and/or throughput, are classified by appropriate levels.

In a next step 54, the network element 16 defines the preamble (e.g., by defining its length) using a predetermined criterion: preamble length can depend on the degree of fading of the multipath channel or/and a throughput relative to a nominal throughput in the data signal, or/and transmission gap in the control signal or in the data signal, etc., according to embodiments of the present invention.

In a next step 56, the network element 16 transmits the preamble defining signal 34 to the user equipment 10. Finally, in a next step 58, the user equipment 10 provides the control signal (e.g., on the DPCCH) with the preamble (signal 32b) of the defined length to the network element 16.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

Also, it is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
providing a data signal on a data channel and a control signal on a control channel from a user equipment to a network element in a communication system adapted for continuously connected users; and
transmitting from said user equipment said control signal comprising a power control preamble, wherein a preamble length of the power control preamble is at most a maximum preamble length in accordance with a maximum preamble length instruction received in the user equipment from said network element, and wherein said preamble length of the power control preamble depends on a transmission gap length in said control signal or in said data signal.

2. The method of claim 1, wherein said transmission gap length is variable.

3. The method of claim 1, wherein said control channel is an uplink dedicated physical control channel transmitting said power control preamble from said user equipment to said network element.

4. The method of claim 3, wherein said network element is a Node B and the network element and the user equipment are configured for wireless communications.

5. The method of claim 3, wherein said user equipment is a wireless device, a portable device, a mobile communication device or a mobile phone.

6. The method of claim 3, wherein said preamble length of the power control preamble is defined by said network element.

7. The method of claim 3, wherein said preamble length of the power control preamble is defined by said user equipment.

8. The method of claim 1, wherein said data channel is an enhanced dedicated channel.

9. The method of claim 1, wherein before said transmitting said power control preamble, the method comprises:
defining a power control preamble power time dependence.

10. The method of claim 1, wherein the preamble length of the power control preamble further depends on a length of a transmission timing interval of said data signal.

11. The method of claim 1, wherein during said defining, said preamble length of the power control preamble is changed by a pre-selected value using said predetermined criterion depending on a change in said transmission gap length.

12. The method of claim 10, wherein said preamble length of the power control preamble is non-zero only if said transmission gap exceeds a pre-defined threshold value.

13. A non-transitory computer readable storage structure stored with code thereon for execution by a computer processor, wherein said code comprises instructions for performing the method of claim 1.

14. An apparatus, comprising:
a processor; and
memory including computer program code,
the memory and the computer program code configured to, with the processor, cause the apparatus at least to:
provide a data signal on a data channel and a control signal comprising a power control preamble on a control channel, wherein a preamble length of the power control preamble is at most a maximum preamble length according to a maximum preamble length instruction received in the apparatus from a network and said preamble length of the power control preamble depends on a transmission gap length in said control signal or in said data signal; and
transmit said control signal comprising said power control preamble.

15. The apparatus of claim 14, wherein said transmission gap length is variable.

16. The apparatus of claim 14, wherein said control channel is an uplink dedicated physical control channel transmitting said power control preamble from the apparatus to a network element.

17. The apparatus of claim 14, wherein the memory and the computer program code are further configured, with the processor, to cause the apparatus at least to define said preamble length of the power control preamble using input information provided by a network element.

18. The apparatus of claim 14, wherein the memory and the computer program cod are further configured, with the processor, to cause the apparatus at least to define said preamble length of the power control preamble.

19. The apparatus of claim 14, wherein said data channel is an enhanced dedicated channel.

20. The apparatus of claim 14, wherein the preamble length of the power control preamble further depends on a length of a transmission timing interval of said data signal.

21. The apparatus of claim 20, wherein during said defining said preamble length of the power control preamble is changed by a pre-selected value depending on a change in said transmission gap length.

22. The apparatus of claim 20, wherein said preamble length of the power control preamble is non-zero only if said transmission gap exceeds a pre-defined threshold value.

23. The apparatus of claim 20, wherein said transmission gap length is variable.

24. The apparatus of claim 14, wherein said preamble of the power control preamble has a dynamic length varied during transmission of said data signal.

25. The apparatus of claim 14, comprising an integrated circuit.

26. The apparatus of claim 14, wherein said control channel and said data channel are combined such that said control signal and said data signal are transmitted on one combined channel.

27. A non-transitory computer readable medium, comprising computer program code stored thereon that together with a processor of a user equipment is configured cause the user equipment to;
provide a data signal on a data channel and a control signal on a control channel comprising a power control preamble in said communication system adapted for continuously connected users, wherein a preamble length of the power control preamble is at most a maximum preamble length according to a maximum preamble length instruction received in the user equipment from a network element wherein said preamble depends on a transmission gap length in said control signal or in said data signal, and
transmit said preamble on said control channel.

28. The non-transitory computer readable medium of claim 27, wherein said transmission gap length is variable.

29. The non-transitory computer readable medium of claim 27, wherein the preamble length of the power control preamble further depends on a length of a transmission timing interval of said data signal.

30. An apparatus, comprising:
signal generation means, for providing a data signal on a data channel and a control signal comprising a power control preamble on a control channel, wherein a preamble length of the bower control preamble is defined adaptively, wherein said preamble length of the power control preamble is at most a maximum preamble length according to a maximum preamble length instruction received in the apparatus from a network element and said preamble length of the power control preamble depends on a transmission gap length in said control signal or in said data signal; and
means for transmitting said control signal comprising said power control preamble.

31. The apparatus of claim 30, wherein the signal generation means is an uplink scheduling and signal generating module.

32. An apparatus, comprising:
a processor; and
memory including computer program code,
the memory and the computer program code configured to, with the processor, cause the apparatus at least to:
receive a data signal on a data channel and a control signal comprising a power control preamble on a control channel from a user equipment;
adaptively define a preamble length of the power control preamble for instructing the user equipment, wherein said preamble length depends on a transmission gap length in said control signal or in said data signal; and
transmit a preamble defining signal for said power control preamble to the user equipment.

33. The apparatus of claim 32, wherein the preamble length of the power control preamble further depends on a length of a transmission timing interval of said data signal.

34. A method, comprising:
defining a preamble length of a power control preamble depending on a transmission gap length in a control signal or in a data signal;
transmitting a preamble defining signal for instructing said preamble length, and
receiving a data signal on a data channel and a control signal comprising said power control preamble on a control channel in a communication system adapted for continuously connected user equipment.

35. The method of claim 34, wherein said data signal and said control signal comprising said power control preamble are received by a network element from said user equipment and said control channel is an uplink dedicated physical control channel.

* * * * *